United States Patent [19]
Jaworski et al.

[11] Patent Number: 6,138,509
[45] Date of Patent: Oct. 31, 2000

[54] WATER LEVEL MONITORING FLOAT SYSTEM

[75] Inventors: Ed Jaworski; Dennis Zlipko, both of Saskatchewan, Canada

[73] Assignee: Saskatchewan Research Council, Saskatchewan, Canada

[21] Appl. No.: 09/022,141

[22] Filed: Feb. 11, 1998

[30] Foreign Application Priority Data

Feb. 11, 1997 [CA] Canada ................................. 2197248

[51] Int. Cl.⁷ ............................................. G01F 23/76
[52] U.S. Cl. ............................................ 73/322.5; 73/319
[58] Field of Search .................. 33/713, 719; 73/290 B, 73/305, 319, 321, 322.5

[56] References Cited

U.S. PATENT DOCUMENTS

| | | |
|---|---|---|
| 1,634,608 | 7/1927 | Boegen . |
| 1,967,631 | 7/1934 | Schweizer . |
| 2,571,378 | 10/1951 | Parisi . |
| 2,700,222 | 1/1955 | Swenson ................................. 73/321 |
| 3,080,753 | 3/1963 | Tickner et al. .......................... 73/306 |
| 4,065,226 | 12/1977 | Campbell ............................. 73/321 X |
| 4,249,598 | 2/1981 | Greer ..................................... 116/228 |

*Primary Examiner*—Hezron Williams
*Assistant Examiner*—Willie Morris Worth
*Attorney, Agent, or Firm*—Frost & Jacobs LLP

[57] ABSTRACT

The invention provides an improved float and float system for use in the monitoring of fluid levels, particularly in small diameter wells by way of a cable and float system. The float system includes a number of centralizers which hold the float cable near the center of the well casing and thus reduce the friction of the cable on the casing walls. The addition of weights on the float cable, either or both below the float and between the float and the top of the well casing, can improve the accuracy and operation of the system even further. A truncated cone-shaped float is provided, with a number of fins displaced evenly around the circumference of the float.

10 Claims, 3 Drawing Sheets

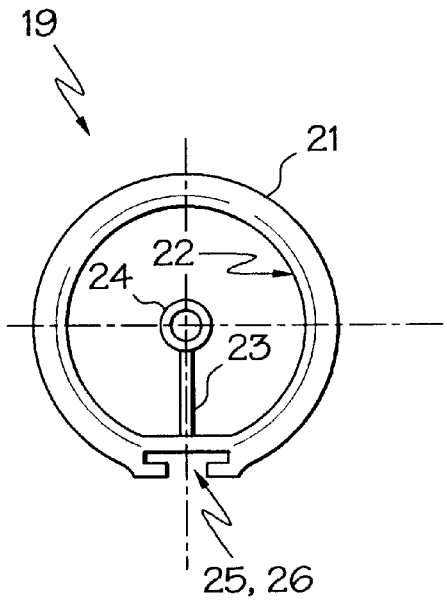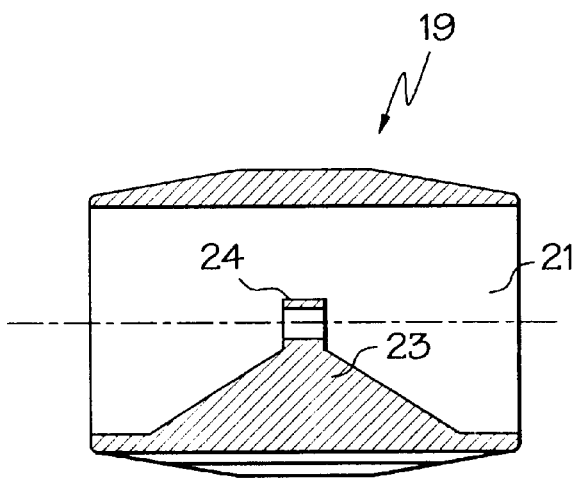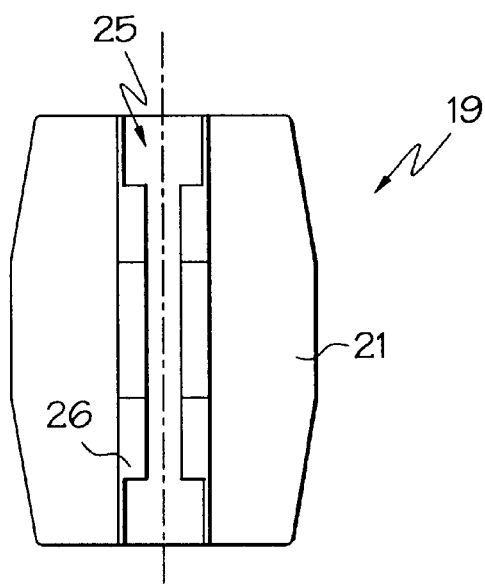

WATER LEVEL MONITORING FLOAT SYSTEM

This invention deals with accurate long-term groundwater monitoring in small diameter wells, and particularly with an improved float measuring device and apparatus for the deployment of same.

BACKGROUND

The use of instruments in obtaining accurate long term water level data is difficult and expensive. Some of the methods in the prior art which have been used to date with limitations to their utility and cost efficiency are submersible pressure transducers, which tend to drift over a period of time, and float operated water level recorders which are limited in their utility by their requirement of a fairly large diameter and plumb well—i.e. with a diameter greater than fifteen centimeters. A crooked well will cause such a float to adhere to the well casing and result in poor water level recordings. Water level monitoring wells of 5 and 12 centimeter diameters are becoming standard in the industry and, as such, the float operated water level recorders are limited in their utility to this extent as well.

The present invention deals with a float system to be used to obtain such water level monitoring data, representing an improvement over the current art in a number of ways, including A) the shape and small surface of the float employed, as well as improvements in the placement of the float within the well, minimizes the friction and capillary attraction forces;

B) a low center of gravity, with more than eighty percent of the float being submerged, provides stable flotations;

C) the design assures adequate pushing and pulling; and

D) when used in conjunction with a shaft encoder, the device is capable of supplying accurate long-term water level data from water level monitoring wells as small as five centimeters in diameter.

SUMMARY OF THE INVENTION

The object of the invention is to provide accurate long-term water level monitoring data in small diameter wells.

The invention, a float system for fluid level monitoring within a well casing, comprises one or more float cable centralizers small enough to move within the well casing; a float centralizer support to which the float cable centralizer(s) are fixedly attached; a float cable extending freely through the center of the float cable centralizer(s), said float cable having a top end and a bottom end; and a float, attached to the float cable at or near its bottom end; where in use the device is lowered into place in the well casing by lowering the float centralizer support down the well casing, and the top end of the float cable is attached to conventional cable fluid level monitoring means.

A float cable counter weight can be added at the bottom end of the float cable, or a float cable tension weight can be attached between the top end of the float cable and the float itself, in order to further improve the stability and accuracy of the device.

Many different float cable centralizers could be used. In this case the float cable centralizer comprises a cylindrical tube of small enough diameter to move and be lowered freely within the well casing, an arm extending from the inner wall of the tube towards its center; and a cable loop on the end of the arm, through which the float cable can freely travel. The cylindrical tube of the centralizer can be tapered inwards at its ends to make it move even more smoothly within the well casing.

The float centralizer support can be marked with measurements so that the operator can tell how far down the well casing the device has been lowered. A flexible tape measure might be used as the float centralizer support.

Various float cables could be used, including a stainless steel cable.

This system could be used with various floats.

One float design for the purposes of the present invention consists of a truncated cone shaped float. The bottom of the columnar float has a bottom cone section tapering it in and sealing it. The top of the columnar float also has a tapered and sealed end top cone section. The tapered shape of the top cone section of the columnar float enables water level measuring devices to get past the float. Below the top cone section of the columnar float are a plurality of, and in this case eight, fins equally spaced around the circumference of the float. The truncated shape of the float along with the fins reduce the capillary attraction between the device and the well casing. The fins provide minimum float friction against the casing wall and allow for the float to pass by casing joints.

Within the columnar float is a weight, attached in position as to maximize the reliability and stability of the floating action of the device. There are attachment means, in this case a cap screw, on top of the tapered top end of the columnar float to attach to the remainder of the water level monitoring gear.

This float design might also be useful in other applications than this system and such other applications are contemplated within the scope of the claimed invention.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 3 is a top view of one embodiment of the float cable centralizer of the present invention;

FIG. 4 is a side sectional view of the centralizer of FIG. 3 showing the arm and cable loop FIG. 5 is a side view of the float cable centralizer of FIG. 3 showing the means of attachment of the centralizer support.

DETAILED DESCRIPTION OF THE EMBODIMENT

Figure 1:
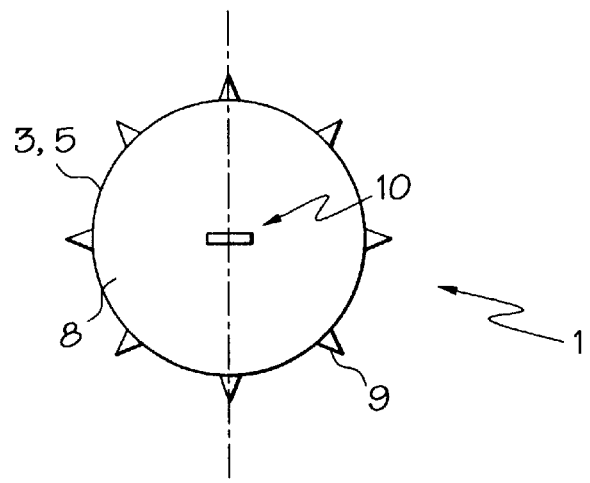
FIG. 1 is a top view of one embodiment of the float device of the present invention.

Float minimizing capillary attraction to casing walls:

The first problem which the present invention seeks to address is the problem of friction or excessive capillary attraction of float measuring devices to the well casing. The novel float employed by the system of the present invention is demonstrated in FIGS. 1 and 2. The float device 1 consists of a columnar float 2, having a top and bottom end numbered 3 and 4 respectively. The diameter 5 at the top end of the float is larger than the diameter 6 at the bottom end.

The float 2 in this embodiment has the shape of a truncated cone-shaped column. At the bottom end 4 of the columnar float is a tapered bottom cone section 7 which closes off the columnar float 2. Similarly: there is a top cone section 8 at the top end 3 of the float.

The float device 1 could be used to monitor levels in water wells, as well as the levels of other fluids in tanks and other containers. To monitor fluids of different viscosities or specific gravities the dimensions or weight of the device 1 might be adjusted and it will be understood that these alterations are contemplated within the scope of the present invention.

The present embodiment of the float device 1 also includes a number of fins 9 spaced around the circumference of the top end 3 of the columnar float section. In the present embodiment the number of fins 9 is eight. These fins 9 reduce any friction of the float device 1 against the well casing and enable the float device 1 to ride over joints in the well casing. The fins 9 also result in minimum capillary attraction between the float device 1 and the well casing.

Figure 2:
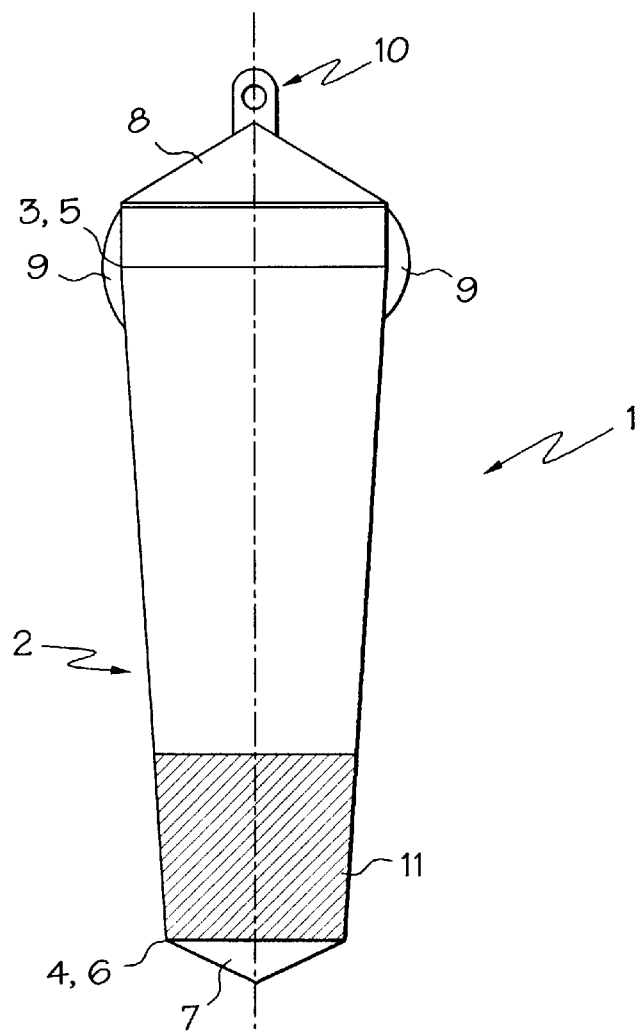
FIG. 2 is an elevated cross-sectional view of one embodiment of the float device of FIG. 1.

Further, in the embodiment shown in FIG. 2 there is a weight 11 positioned and attached within the float 2 to regulate the operation of the device 1 and to provide further stability in the water. Varying weights and positions of the weight are contemplated.

There is attached to the top cone section 8 a cap screw 10 facilitate the attachment of the device 1 to a cable extending down the shaft of the water level monitoring well. Varying clasps and attachments could be used and it will be understood that these are contemplated within the scope and intent of the claimed invention.

It is envisioned that the float device 1 could be manufactured of a number of materials, including plastic or stainless steel. It will be understood that various building materials are contemplated within the scope of the claimed invention.

Float system minimizing cable friction with casing walls:

The float device 1 demonstrated in FIGS. 1 and 2 is one part of the float system of the present invention. The float system in totality comprises one or more float cable centralizers small enough to move within the well casing; a float centralizer support to which the float cable centralizer(s) are fixedly attached; a float cable extending freely through the center of the float cable centralizer(s), said float cable having a top end and a bottom end; and a float, attached to the float cable at or near its bottom end; where in use the device is lowered into place in the well casing by lowering the float centralizer support down the well casing, and the top end of the float cable is attached to conventional cable fluid level monitoring means.

One embodiment of the float cable centralizer 19 is demonstrated in FIGS. 3 to 5. The purpose of the centralizer 19 is to make the float cable run roughly down the center of the well casing, away from the casing walls, and thus eliminate the problem of friction of the float cable against the casing walls. The float cable centralizer 19 needs to be small enough to move freely down the well casing when lowered therein, and yet large enough so as not to catch and jam sideways in the casing.

In this case the float cable centralizer 19 comprises a cylindrical tube 21 of small enough diameter to move and be lowered freely within the well casing, an arm 23 extending from the inner wall 22 of the tube towards its center; and a cable loop 24 on the end of the arm 23, through which the float cable can freely travel.

The cylindrical tube 21 of the centralizer can be tapered inwards at its ends to make it move even more smoothly within the well casing. FIG. 5 demonstrates the tapered ends of the float cable centralizer.

Figure 6:
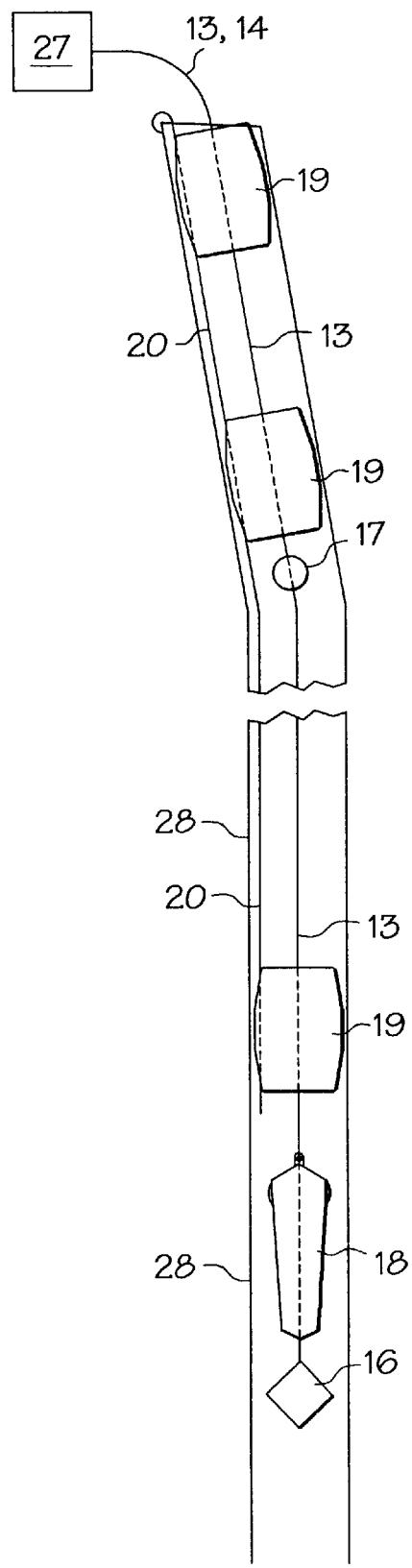
FIG. 6 shows the system of the present invention in place in a well casing.

FIG. 6 shows the system 12 in place in a well casing 28. The centralizers 19 are attached at positions along the down-hole portion of the centralizer support 20. In the present case, as demonstrated best in FIGS. 2 and 4, tapered notch and wedge 25, 26 are provided along the edge of the centralizer 19 to allow for attachment to the measuring tape 20.

The float cable centralizer or centralizers 19 are attached to a float centralizer support 20 to allow them to be lowered into the well casing. The float centralizer support 20 should be flexible in order to navigate any irregularities in the well casing, although a rigid support 20 could be used if the casing were straight and unobstructed. It will be understood that all of these types of materials used as a support 20 are contemplated within the scope of the present invention.

The float centralizer support 20 can be marked with measurements so that the operator can tell how far down the well casing the device has been lowered. In the present embodiment the float centralizer support which is used is a plasticized measuring tape.

The float cable 13 extends downwards through the cable loop or loops 24 in the centralizer(s) 19, and a float 18 is attached at or near the bottom end 15 of the float cable, before the device is lowered into the well casing.

A float cable counter weight can be added at the bottom end of the float cable, to provide tension on the float cable and also to provide the necessary friction to prevent float cable slippage on the pulley of the water level recorder, where that type of recorder is used. The size of the weight might be varied. In this case the float cable counter-weight is demonstrated at 16 in FIG. 6.

Similarly, a float cable tension weight can be attached between the top end 14 of the float cable and the float 18 itself, in order to further improve the stability and accuracy of the system. This might be necessary where a smaller diameter float 18 is used, to provide the proper weight on the float cable 13 to prevent slippage of the float cable 13 on the pulley of the water level recorder 27. In such a case the float cable tension weight 17 could be placed at a point slightly above the float 18 on the float cable 13. The float cable tension weight 17, as demonstrated in FIG. 5, might also be located further up the float cable 13 in a case where the well casing 28 is crooked.

The float cable 13 could be made of any number of materials which would function properly in the environment of a well casing. The float cable of the present embodiment is a stainless steel cable, but it will be understood that any other suitable materials are also contemplated within the scope of the present invention.

The demonstrated system uses three float cable centralizers 19. Conventional measurement means 27 are attached to the top end 14 of the float cable, and the fluid level measurements taken therewith. The support 20 can be attached at the top of the well casing 28 to hold the system 12 in place.

The float device 1 demonstrated herein could also improve the efficiency and accuracy of other conventional systems and thus it will be understood that the use of the float device 1 apart from the remainder of the float system is still contemplated within the scope of the claimed invention.

The system could use a float device such as that shown in FIG. 1, or some other type of float is device could be used.

It will be understood that the use of either the device of FIG. 1 or another float device are both contemplated within the scope of the present invention.

Thus it can be seen that the invention accomplishes all of its stated objectives. The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

LISTING OF DIAGRAM REFERENCE NUMERALS:

1. Float device;
2. Columnar float;
3. Top end of columnar float section;
4. Bottom end of columnar float section;
5. Diameter of top end of float section;
6. Diameter of bottom end of float section;
7. Bottom cone section;
8. Top cone section;
9. Fins;
10. Attachment means;
11. Weight;
12. Float system;
13. Float cable;
14. Top end of float cable;
15. Bottom end of float cable;
16. Float cable counter weight;
17. Float cable tension weight;
18. Float;
19. Float cable centralizer;
20. Centralizer support;
21. Cylindrical tube;
22. Inner wall of tube;
23. Arm;
24. Float cable loop;
25. Support attachment notch;
26. Support attachment wedge;
27. Level measurement and monitoring means;
28. Well casing.

What is claimed is:

1. A float system for use in the monitoring and measurement of fluid levels in wells with tubular casing, said system comprising one or more float cable centralizers small enough to move within the well casing; a float centralizer support to which the float cable centralizer(s) are fixedly attached; a float cable extending freely through the center of the float cable centralizer(s), said float cable having a top end and a bottom end; and a float, attached to the float cable at or near its bottom end; where in use the device is lowered into place in the well casing by lowering the float centralizer support down the well casing, and the top end of the float cable is attached to conventional cable fluid level monitoring means.

2. The float system of claim 1 further comprising a float cable counter-weight attached to the bottom end of the float cable below the float.

3. The float system of claim 1 further comprising a float cable tension weight attached to the float cable between the float and the top end of the float cable.

4. The float system of claim 1 wherein each float cable centralizer comprises a cylindrical tube of small enough diameter to move and be lowered freely within the well casing, an arm extending from the inner wall of the tube towards its center; and a cable loop on the end of the arm, through which the float cable can freely travel.

5. The float system of claim 4 wherein the cylindrical tube is tapered inwards at its ends.

6. The float system of claim 1 wherein the float centralizer support is marked with measurements so that the operator can tell how far down the casing the device has been lowered.

7. The float system of claim 6 wherein the float centralizer support is a flexible tape measure.

8. The float system of claim 1 wherein the float cable is a stainless steel cable.

9. The float system of claim 1 wherein the float is a columnar float having two ends, being the top end and the bottom end, said top end having a larger diameter than said bottom end, said columnar float being tapered inwards from the top end to the bottom end; and a plurality of fins placed around the circumference of the top end of the float at its widest point, said fins extending outward from the top end.

10. The float system of claim 9 wherein the float further comprises a top cone section, wherein the top end is tapered upwards and inwards from its widest point to a top sealed tip; and a bottom cone section, wherein the bottom end is tapered downwards and inwards from its widest point to a bottom sealed tip, at an angle greater than that of the general inward taper of the columnar float from its top end to its bottom end.

* * * * *